(12) United States Patent
Belinguier et al.

(10) Patent No.: US 7,932,871 B2
(45) Date of Patent: Apr. 26, 2011

(54) ORTHOGONAL LOOP RADIOFREQUENCY ANTENNA DEVICE

(75) Inventors: Thierry Belinguier, Creitel Cedex (FR); Bruno Duban, Creitel Cedex (FR)

(73) Assignee: Valeo Securite Habitacle, Creteil Cedex (FR)

( * ) Notice: Subject to any disclaimer, the term of this patent is extended or adjusted under 35 U.S.C. 154(b) by 119 days.

(21) Appl. No.: 11/910,901

(22) PCT Filed: Apr. 5, 2006

(86) PCT No.: PCT/EP2006/061360
§ 371 (c)(1), (2), (4) Date: Oct. 5, 2007

(87) PCT Pub. No.: WO2006/106126
PCT Pub. Date: Oct. 12, 2006

(65) Prior Publication Data
US 2008/0191958 A1    Aug. 14, 2008

(30) Foreign Application Priority Data
Apr. 6, 2005 (FR) ...................... 05 03447

(51) Int. Cl.
*H01Q 21/00* (2006.01)
*H01Q 1/32* (2006.01)

(52) U.S. Cl. ....................... 343/867; 343/711

(58) Field of Classification Search ........... 343/711, 343/742, 867
See application file for complete search history.

(56) References Cited

U.S. PATENT DOCUMENTS

| | | | | |
|---|---|---|---|---|
| 3,019,335 A | * | 1/1962 | Brilliant | 455/193.1 |
| 3,882,506 A | * | 5/1975 | Mori et al. | 343/728 |
| 4,433,336 A | * | 2/1984 | Carr | 343/728 |
| 5,701,130 A | * | 12/1997 | Thill et al. | 343/895 |
| 6,052,091 A | | 4/2000 | Lee et al. | |
| 6,229,492 B1 | | 5/2001 | Lee et al. | |
| 6,380,901 B1 | * | 4/2002 | Tessier | 343/713 |
| 2003/0184493 A1 | | 10/2003 | Robinet et al. | |

FOREIGN PATENT DOCUMENTS

| | | |
|---|---|---|
| DE | 195 33 105 A1 | 10/1996 |
| EP | 1 298 761 A | 4/2003 |
| EP | 1 376 762 A | 1/2004 |
| EP | 1 594 188 A | 11/2005 |
| FR | 2 865 329 A | 7/2005 |

OTHER PUBLICATIONS

English translation of an International Search Report issued in PCT/EP2006/061360 dated Jul. 24, 2006, 3 pages.

* cited by examiner

*Primary Examiner* — Shih-Chao Chen
(74) *Attorney, Agent, or Firm* — Osha • Liang LLP

(57) ABSTRACT

The invention concerns an orthogonal loop radiofrequency antenna device designed to receive electromagnetic waves comprising at least two loops (BH, BV) consisting of a single electrical conductor, each of said loops (BH, BV) capable of having a particular shape and located in their respective plane, said planes containing each one of said loops (BH, BV) being orthogonal, and the radiofrequency antenna being located proximate a low frequency antenna.

25 Claims, 7 Drawing Sheets

ORTHOGONAL LOOP RADIOFREQUENCY ANTENNA DEVICE

FIELD OF THE INVENTION

The present invention relates to a radiofrequency antenna device with orthogonal loops.

It is especially applicable to radiofrequency reception in a confined environment, and notably in spaces limited principally by metal walls, such as the passenger compartments of land vehicles.

PRIOR ART

Generally speaking, it is known that, in order to achieve this result, the current technical solution consists in using antennas of the monopole type, the dipole type, the patch type, etc., and more generally, antennas of the loop type.

These receiver antennas are notably employed in so-called "hands-free" devices for radiofrequency remote control, access and starter systems, wireless alarms, garage door opening, lighting control, roller blinds, and also remote measurement devices.

Inside a vehicle passenger compartment, in view of the number of reflections caused by the presence of numerous, mainly metal, walls, radiofrequency reception may be degraded notably due to the fact that the polarization of the wave picked up by the loop antenna will not necessarily correspond to the polarization corresponding to the maximum detection sensitivity.

As a consequence, the radiofrequency range of the transmitter around the passenger compartment of the vehicle will thus be reduced in average value, on the one hand, and in uniformity, on the other, all around the vehicle.

Furthermore, for reasons of mechanical construction of the vehicle and of limited room, the space occupied by this radiofrequency antenna needs to be optimized.

SUBJECT OF THE INVENTION

The aim of the invention is therefore, more particularly, to eliminate these drawbacks.

It therefore provides a radiofrequency antenna device with orthogonal loops disposed close to a low-frequency antenna and involving the use of at least two loops formed from a single electrical conductor, each of said loops being able to be of any shape and situated in their respective planes, said planes each containing one of said loops being orthogonal.

Thus, as will be seen in detail hereinbelow, there will not only be an improvement in the reception of the radiofrequency signals thanks to the configuration of the radiofrequency antenna, but also an optimization of the space occupied by this radiofrequency antenna, since it is associated with a low-frequency antenna so as to avoid putting each of said antennas at two different locations in the vehicle.

According to nonlimiting embodiments, the device according to the invention presents the following additional features:
  advantageously, the shape of said loops could be circular, square, rectangular; the shapes of said loops will not have to be identical; thus, one of said loops will be of circular shape, the other of said loops will be of rectangular shape;
  furthermore, said two orthogonal planes, each containing one of said radiofrequency antenna loops, could be situated in any given orientation in the orthonormal reference frame; preferably, one of said loops is contained within a vertical plane; the other of said loops is contained within a horizontal plane;
  the two loops of the radiofrequency antenna are connected in series or in parallel;
  advantageously, the electrical conductor of one antenna will be made of a material of low ohmic resistivity, such as copper, aluminum or its alloys, nickel, silver or of an association of several metals, such as copper coated with a layer of gold; the cross section of the electrical conductor could advantageously be circular, square, rectangular or even of any given shape. Thus, the low-resistivity material allows the resistive heating losses to be reduced. The received signal is less degraded;
  furthermore, the assembly formed by said loops could be coated with a dielectric material such as PTFE, PET, PVC, or others, in such a manner as to guarantee a satisfactory rigidity of the assembly;
  the dimensions of said loops of the radiofrequency antenna are of course determined by the frequency of the electromagnetic wave of the radiofrequency signal received; an acceptable compromise must be reached between the smallest possible sizing in order to adapt to the mechanical constraints of the vehicle (namely, to be able to integrate the loops into a restricted space of the vehicle) and the highest possible detection level;
  advantageously, the antenna device could be integrated into a module situated at the top of the steering column, or within a processor that manages the sensors and actuators of the passenger compartment;
  the radiofrequency antenna is molded together with said low-frequency antenna;
  the low-frequency antenna is associated with circuits, of the tank circuit type, which present a high impedance at the working frequency of the radiofrequency antenna;
  the tank circuits prevent a resonance of the low-frequency antenna at the working frequency of the radiofrequency antenna;
  these high-impedance circuits comprise a high-frequency notch filter;
  the radiofrequency antenna is tuned by means of matching circuits; and
  the low-frequency antenna is responsible for the function authorizing start-up.

In this type of topological configuration, the electronic circuits associated with the radiofrequency antenna will notably allow management of the functions of the vehicle access type, with or without hands-free controls, etc. The electronic circuits associated with the low-frequency antenna will, for their part, notably allow management of the functions of the start-up authorization type and, more particularly, the anti-theft unlocking function in order to enable start-up.

A second subject of the invention relates to: an antenna device comprising a radiofrequency antenna device according to any one of the preceding features, and a low-frequency antenna, the two antennas being disposed close to one another.

According to this second subject, in a nonlimiting manner, the radiofrequency antenna is tuned by means of matching circuits.

A third subject of the invention relates to: An electronic system, characterized in that it comprises:
  a radiofrequency antenna device according to any one of the preceding features, situated close to a low-frequency antenna, the whole assembly forming a mixed antenna device; and
  an electronic board associated with the antenna device and with the low-frequency antenna comprising at least one tank circuit, associated with the low-frequency antenna, which presents a high impedance at the working frequency of the radiofrequency antenna.

According to nonlimiting embodiments, the system comprises the following additional features:
- the electronic board is situated in a plane parallel to one loop of the radiofrequency antenna;
- the electronic system also comprises a capacitor in series with the low-frequency antenna; and
- the electronic system also comprises at least one matching circuit for tuning the radiofrequency antenna.

A fourth subject of the invention relates to: An electronic board designed to cooperate with the radiofrequency antenna according to any one of the preceding features, the radiofrequency antenna device comprising a radiofrequency antenna situated close to a low-frequency antenna, characterized in that it comprises:
- a radiofrequency receiver designed to cooperate with the radiofrequency antenna;
- a low-frequency transceiver designed to cooperate with the low-frequency antenna; and
- at least one tank circuit, associated with the low-frequency antenna, which presents a high impedance at the working frequency of the radiofrequency antenna.

In a nonlimiting manner, the electronic board also comprises at least one matching circuit for tuning the radiofrequency antenna.

BRIEF DESCRIPTION OF THE FIGURES

One method of implementation will be described hereinbelow, by way of nonlimiting example, with reference to the appended drawings in which.

DETAILED DESCRIPTION OF THE
NON-LIMITING EXEMPLARY EMBODIMENTS
OF THE INVENTION

Figure 1:
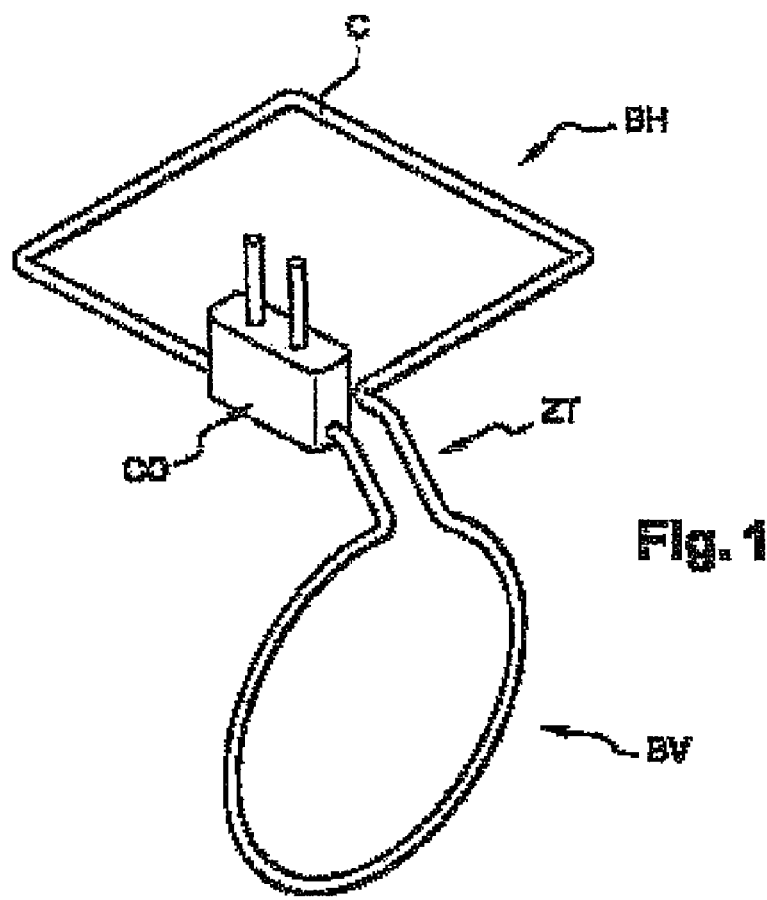
FIG. 1 is a perspective view of a first example of a radiofrequency device according to the invention.

In the example shown in FIG. 1, the radiofrequency antenna device with orthogonal loops is essentially composed of an electrical conductor C forming a first loop BH of square shape situated in a horizontal plane, a second loop BV of circular shape situated in a vertical plane, a transition region ZT forming the link between said loops BH, BV, and a connection region CO corresponding to the two ends of said electrical conductor C.

In this nonlimiting example, said ends of the electrical conductor C are situated in a vertical plane perpendicular to said vertical plane containing the second loop BV. The two loops BH and BV are thus connected in series.

In another nonlimiting example, said ends of the electrical conductor C are situated in the plane of one of said loops. For example, they may be situated in the plane of the second loop BV. For this purpose, they will for example be situated in the transition region ZT. In this case, the two loops BH and BV are either connected in parallel or connected in series.

It will be noted that the connection region CO allows the radiofrequency antenna to be connected to a radiofrequency receiver.

The radiofrequency antenna is thus constructed in such a manner as to favor the reception of the electromagnetic waves according to the two polarizations of the received radiofrequency signal: horizontal polarization and vertical polarization.

The fact that the loops are orthogonal offers the advantage of taking into account the two polarizations of the signal emitted by the radiofrequency transmitter, namely the key in the case of the vehicle application.

Figure 2:
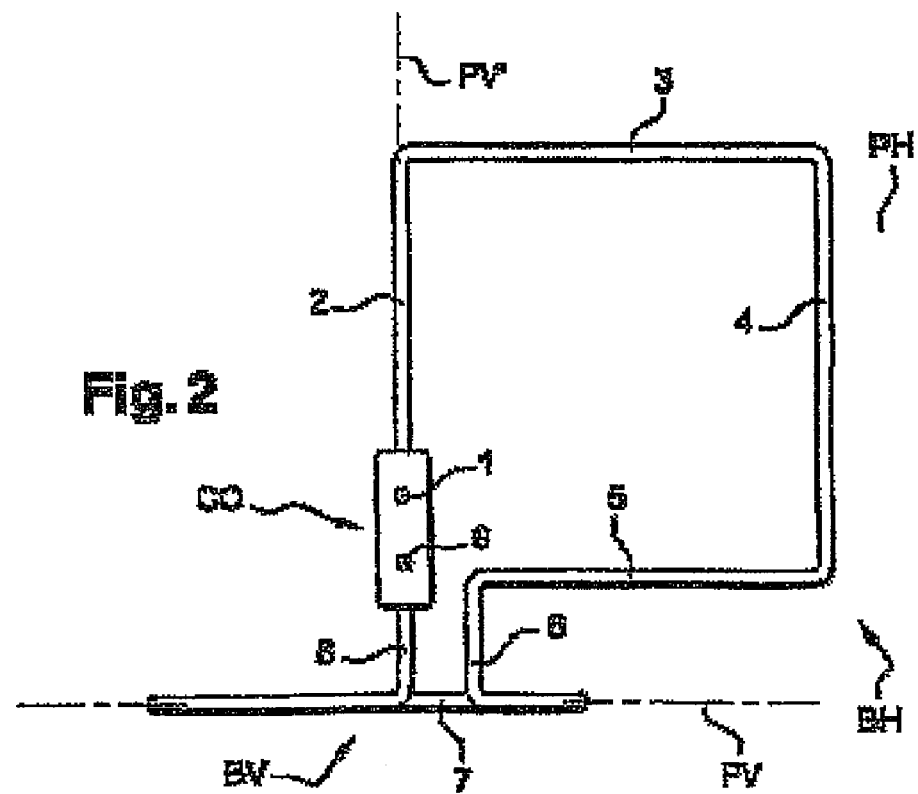
FIG. 2 is a top view of the radiofrequency device according to the invention.

In the nonlimiting example shown in FIG. 2, the radiofrequency antenna device with orthogonal loops is schematically represented according to a top view.

Said loop BH is situated in the horizontal plane PH; said loop BV is situated in the vertical plane PV; the ends of said electrical conductor C are situated in the vertical plane PV', which plane is orthogonal to said planes PH, PV.

The loop BH, of square shape, is composed of a first rectilinear end segment 1 situated in the plane PV', of a second rectilinear segment 2 perpendicular to the plane PV, of a third rectilinear segment 3 parallel to the plane PV, of a fourth rectilinear segment 4 perpendicular to the plane PV and, here, of greater length than that of said segment 2, of a fifth rectilinear segment 5 parallel to the plane PV and, here, of shorter length than that of said segment 3.

The loop BV, of circular shape and situated in the plane PV, is composed of a segment 7 of circular shape, not closing the entirety of the periphery of the corresponding circle.

A first end of the segment 7 is extended by a segment 6 situated in a plane parallel to the plane PV' forming the electrical connection between said loop BH in the extension of the segment 5, and said loop BV; the second end of the segment 7 is extended by a segment 8 situated in the plane PV', which segment is extended by a rectilinear segment 9, parallel to said segment 1 and forming the second end of the electrical conductor C.

Thus, if the wavelength of the electromagnetic wave of the radiofrequency signal detected by the radiofrequency device is much greater than the dimensions of the various abovementioned segments, the current induced by the electromagnetic field is virtually constant all along the segments 1, 2, 3, 4, 5, 6, 7, 8, 9; thus, the fact that the radiofrequency antenna is smaller than the wavelength owing to the mechanical constraints of the vehicle (namely, of the space available for placing the two radiofrequency loops), does not cause a problem; the induced electromotive force is picked up between the two end segments 1, 9; the latter is proportional to the surface areas of the loops BH, BV and to the amplitude of the electric field E detected.

Figure 3:
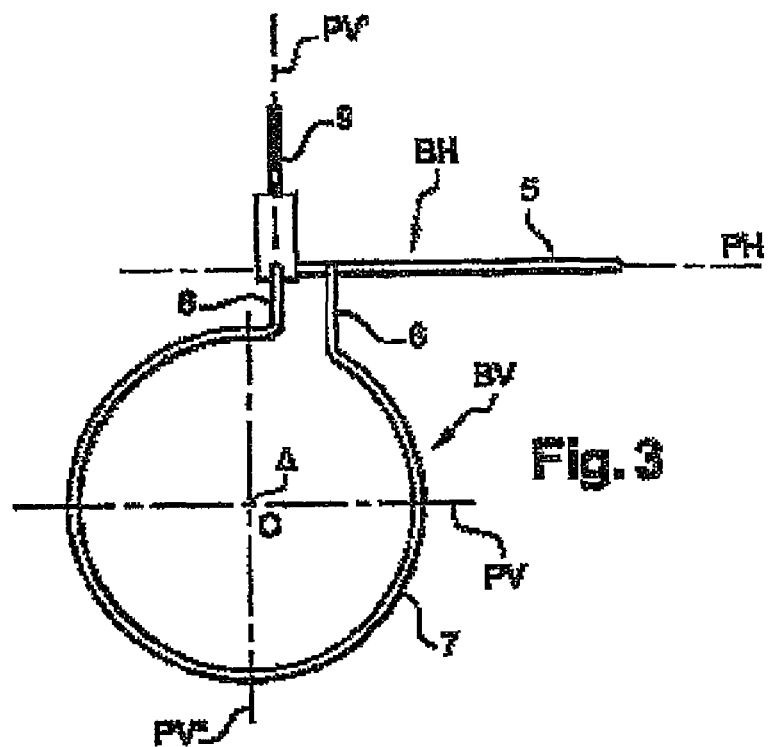
FIG. 3 is a first view in elevation of the radiofrequency device according to the invention.

In the example shown in FIG. 3, the radiofrequency antenna device with orthogonal loops is schematically represented according to a first view in elevation.

Said loop BH is situated in the horizontal plane PH; said loop BV is situated in the vertical plane PV; the ends of said electrical conductor C are situated in the vertical plane PV', which plane is orthogonal to said planes PH, PV.

The loop BH is solely represented by the segment 5; the loop BV is represented by the segment 7; said transition region ZT is composed of the two segments 6, 8; said connection region CO is solely represented by the segment 9.

The loop BV, of center O and of diameter close to the length of said segments 3 or 4, is centered on a horizontal axis Δ; this axis Δ is situated in a vertical plane PV''', parallel to the plane PV'; this plane PV''' is situated on the opposite side to the loop BH with respect to the plane PV'.

Figure 4:
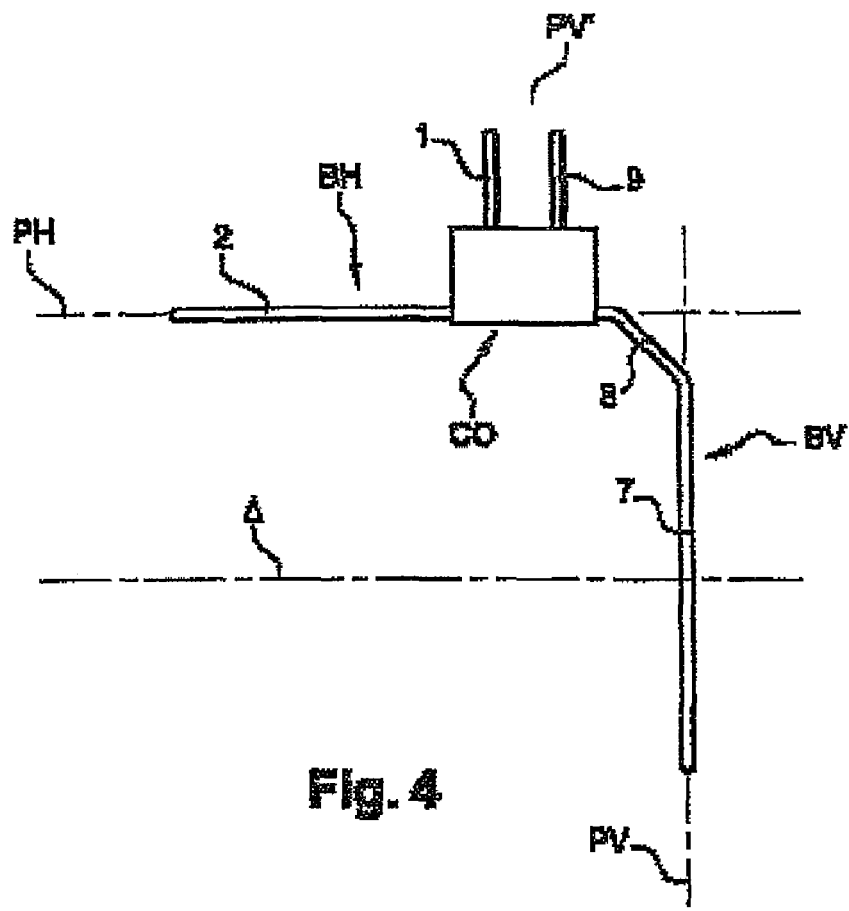
FIG. 4 is a second view in elevation of the radiofrequency device according to the invention.

In the example shown in FIG. 4, the radiofrequency antenna device with orthogonal loops is schematically represented according to a second view in elevation.

Said loop BH is situated in the horizontal plane PH; said loop BV is situated in the vertical plane PV; the ends of said electrical conductor C are situated in the vertical plane PV', which is orthogonal to said planes PH, PV.

The loop BH is solely represented by the segment 2; the loop BV is represented by the segment 7; said transition region ZT is represented solely by the segment 8; said connection region CO is represented by the segments 1, 9.

Said segments 6, 8 are respectively contained in a plane parallel to the plane PV' and in the plane PV'.

In the example shown in FIG. 4, these segments make an angle close to 45 degrees with respect to the plane PV or close to 315 degrees with respect to the plane PH. This is due to certain mechanical constraints of the vehicle. Clearly, this angle can take other values designed for these mechanical constraints.

Figure 5:
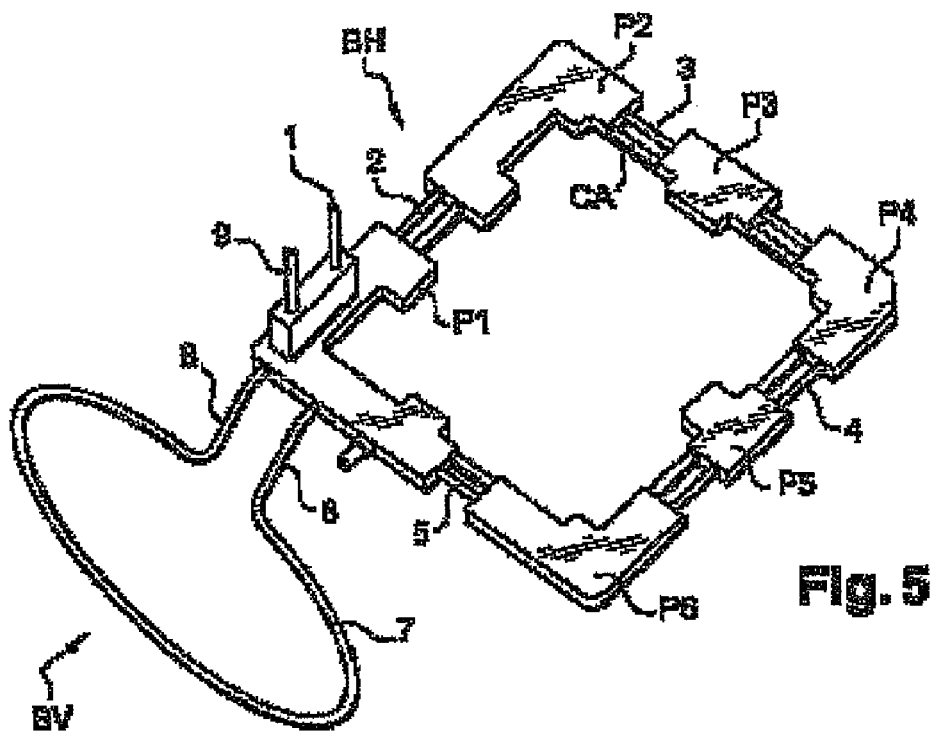
FIG. 5 is a perspective view of the radiofrequency device coated according to the invention.

In the example shown in FIG. 5, the radiofrequency antenna device with orthogonal loops is schematically represented according to a perspective view.

Said loop BH is represented by the segments 2, 3, 4, 5; said loop BV is represented by the segment 7; said transition region ZT is represented by the segments 6, 8; said connection region is represented by the segments 1, 9.

A frame CA, situated in the plane PH, is inscribed within the loop BH and forms a rigidity reference element; this frame CA is connected around its periphery to said loop BH by means of flat sections $P_1, P_2, P_3, P_4, P_5, P_6$.

Said flat sections $P_1, P_2, P_3, P_4, P_5, P_6$, together with said frame CA, are made of dielectric material, such as PTFE, PTE, PVC or others, and allow a satisfactory rigidity of the whole of the radiofrequency device to thus be guaranteed. It will be noted that, with regard to the low-frequency antenna which will described in the following part, this is also made of an insulating material of the PTFE, PTE or PVC type.

Thus, the radiofrequency antenna device with orthogonal loops favors the reception of electromagnetic waves according to two polarizations, which polarizations, depending on the respective positions of said loops BH, BV, can be horizontal and vertical, respectively.

In other words, for a given transmission power, in a confined environment, and notably within spaces limited principally by metal walls, such as the passenger compartments of land vehicles, the power detected by the radiofrequency receiver downstream of said orthogonal loop antenna will be higher; similarly, the uniformity of the radio range of the radiofrequency transmitter/receiver assembly is improved as a result. It will be noted that the radiofrequency transmitter is, for example, the ignition key with the radiofrequency remote unlocking function, or the hands-free badge, etc. Moreover, the average communication distance is improved. It will be noted that, in all the aforementioned nonlimiting examples, the single electrical conductor may of course be replaced, for example, by two electrical conductors welded or brazed together, although this solution is less attractive owing to the problem of splitting or oxidation at the weld or of higher resistivity.

Figure 6:
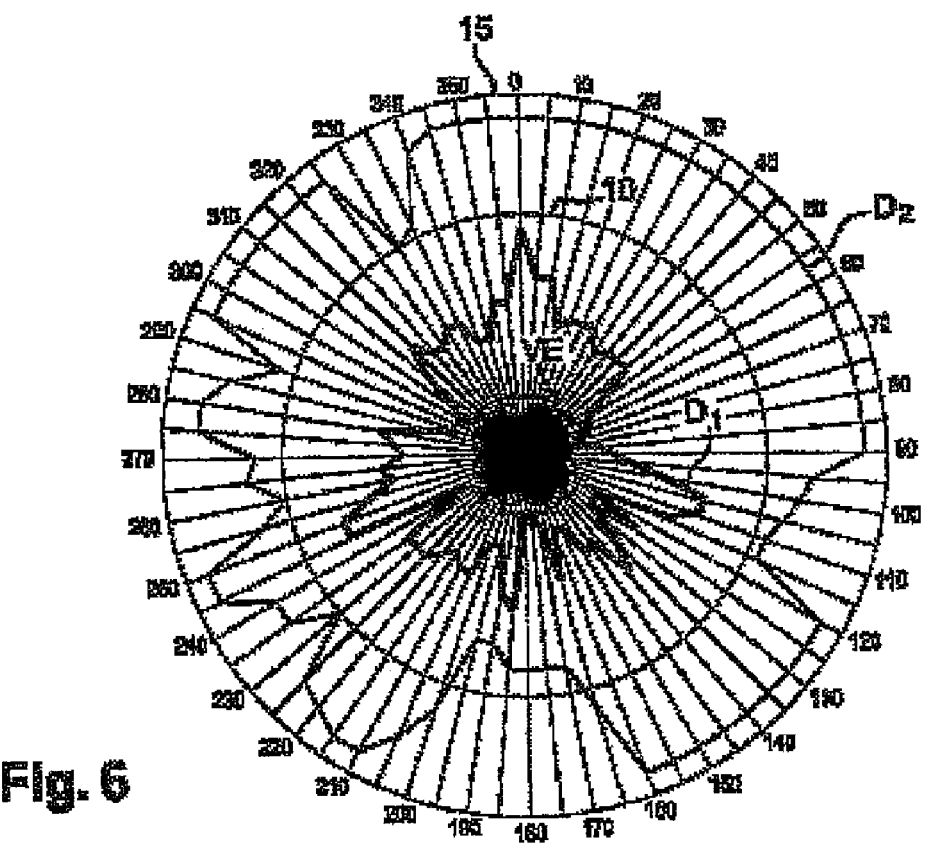
FIG. 6 is a diagram of comparative radiofrequency transmission range in the case of a vehicle passenger compartment.

In the example shown in FIG. 6, a radio range diagram is indicated in a normalized form in the case of a conventional antenna and in the case of a radiofrequency antenna described in the preceding figures.

The diagram is composed of concentric circles around a center O; the increment between circles is 1 meter. The representation of the range is limited to 15 meters, but because of the dimensions of the test chamber (anechoic chamber), the maximum range will be limited to 14 meters.

At the center of the diagram, a vehicle VE is represented schematically in the form of a rectangle whose length is in the neighborhood of 4 meters and whose width is in the neighborhood of 2 meters.

The radio range diagram D1 in the case of a conventional antenna is very variable around the center O; the range is close to zero behind the vehicle VE, close to 2 meters on either side of the vehicle VE and close to 10 meters in front of the vehicle VE.

The radio range diagram D2 in the case of a radiofrequency antenna described in the preceding figures is virtually uniform around the center O; the range is greater than 8 meters behind the vehicle VE, greater than 10 meters on either side of the vehicle VE and greater than 14 meters in front of the vehicle VE.

The radiofrequency antenna device with orthogonal loops can be advantageously employed in automobile applications. For example, it can be integrated into any given location in the passenger compartment (108) of a motor vehicle (100), and notably within a module (not shown) situated at the top of the steering column (102) or in a processor (104) that manages the sensors and actuators (106) of said passenger compartment (108).

A radiofrequency antenna is disposed close to the low-frequency antenna responsible for the function authorizing start-up in the case of the vehicle application. The radiofrequency device described can be molded or encapsulated with said low-frequency antenna in one nonlimiting embodiment. In another example, two different moldings may be used for the two antennas, the two moldings being fixed by clips.

The whole assembly forms a mixed antenna device RF/LF.

It will be recalled that radiofrequencies are from the order of ten megahertz up to around a gigahertz, whereas low frequencies are from the order of a hundred kilohertz up to around a megahertz.

Figure 7:
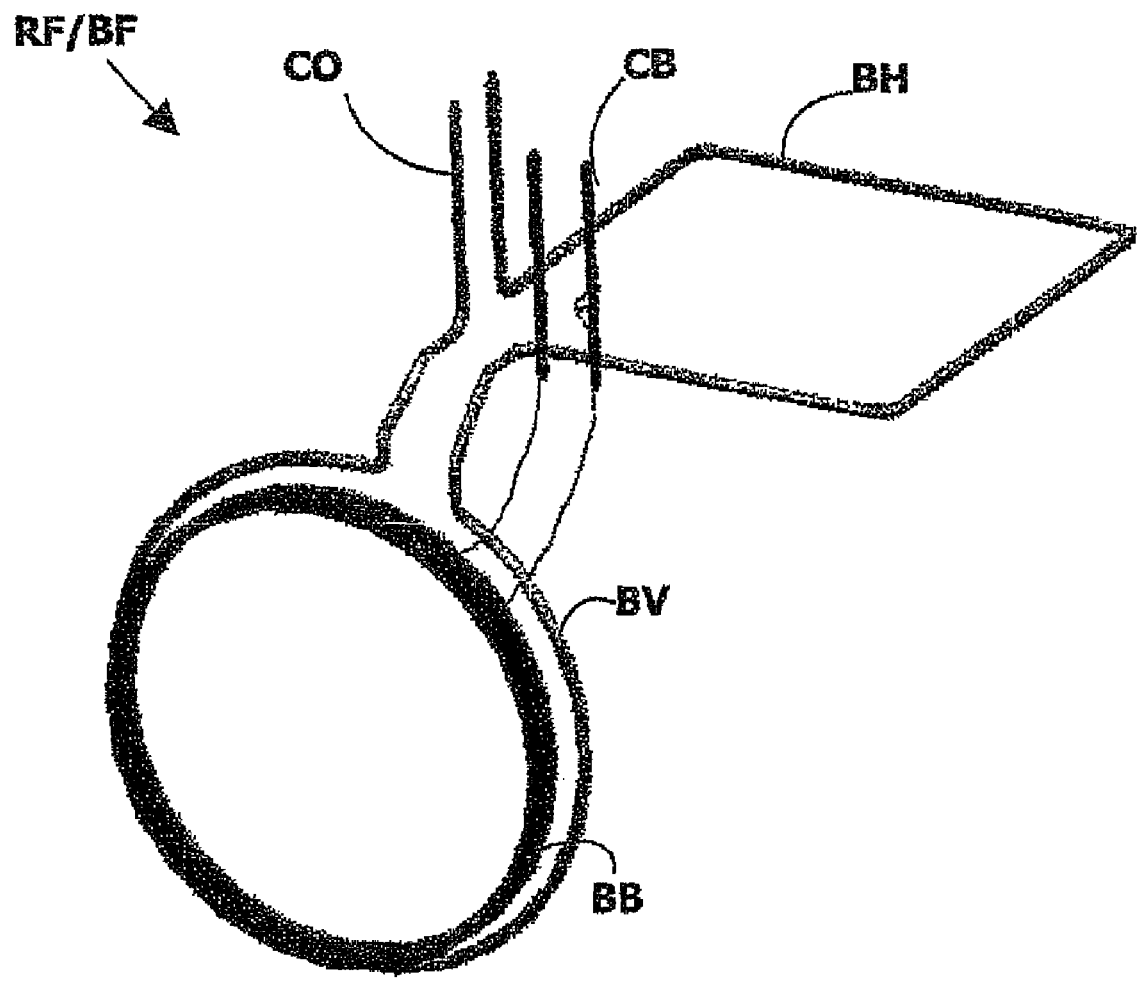
FIG. 7 is a perspective view of a mixed antenna device comprising the radiofrequency antenna device of the preceding figures with no molding and a low-frequency antenna.

Thus, the two radiofrequency and low-frequency antennas are located close to one another so that there exists an electromagnetic coupling between them. In practice, the distance between the two antennas will be less than the size of a loop of one antenna and, more precisely, this relates for example to the distance between one of the loops, here the second loop BV of the radiofrequency antenna RF_A, and the loop BB of the low-frequency antenna LF_A, as illustrated in FIG. 7. A low-frequency antenna is of the multi-turn loop type BB with an electrical conductor C' (or a plurality of conductors welded or brazed together). In FIG. 7, the two connection ends CO of the radiofrequency antenna can be seen together with two other connection ends CB for the low-frequency antenna, these two latter ends CB allowing connection to a low-frequency transceiver.

It will be noted that the electrical conductor of each of the radiofrequency and low-frequency antennas will be made of a material of low ohmic resistivity, such as copper, aluminum or its alloys, nickel, silver or an association of several metals, such as copper coated with a layer of gold; the cross section of the electrical conductor could advantageously be circular, square, rectangular or even of any given shape. Thus, the low-resistivity material allows the resistive heating losses to be reduced. The radiofrequency or low-frequency signal thus received will be less degraded.

Figure 8:
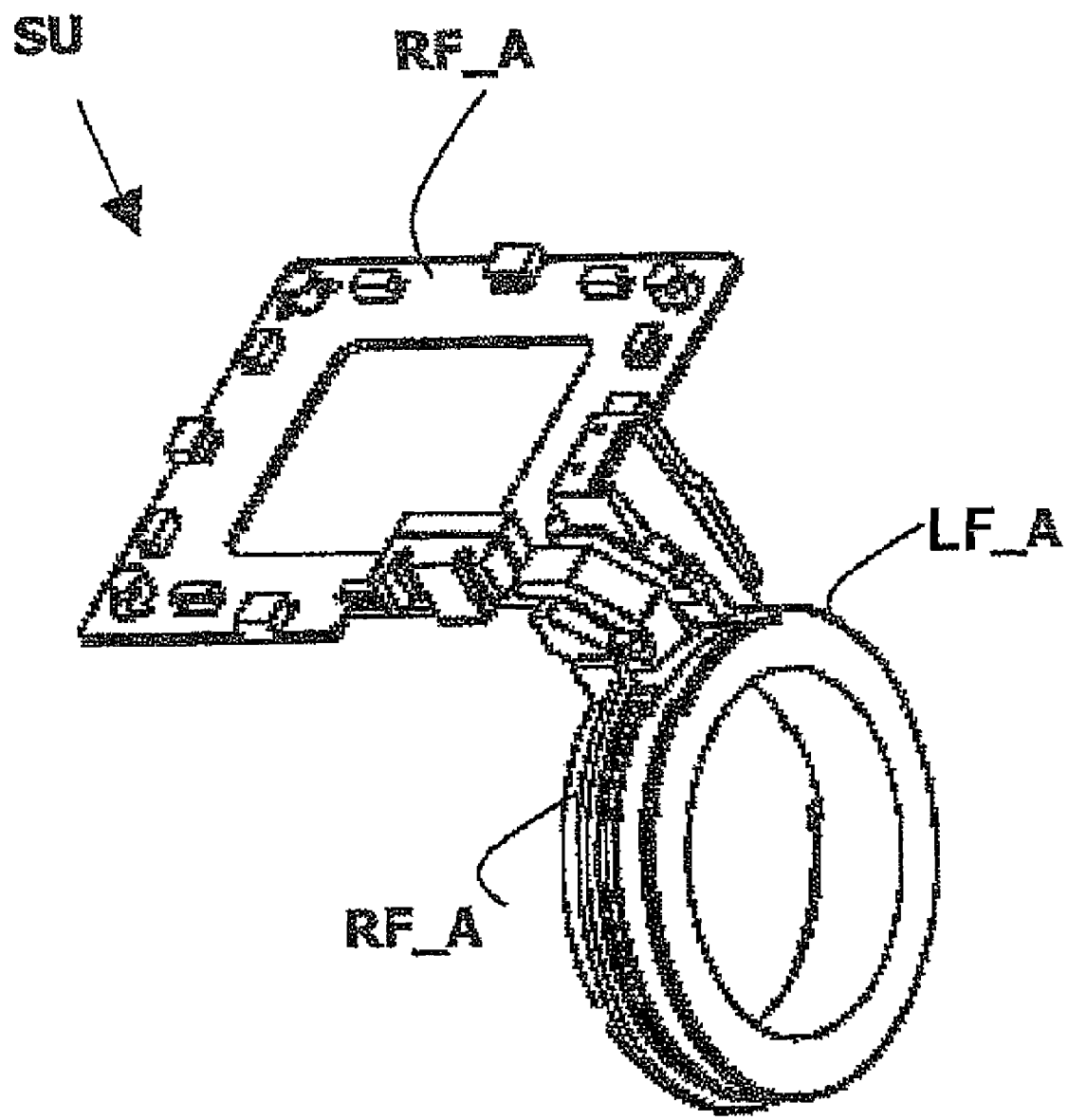
FIG. 8 is a perspective view of the antenna device in FIG. 7 with molding.

In an advantageous manner, one of the two loops of the radiofrequency antenna device RF_A described could be molded or encapsulated with the low-frequency antenna LF_A of the anti-start device, as illustrated in FIG. 8, thus allowing space to be saved, for example at the top of the steering column in the case where the mixed antenna device RF/LF is included in the steering column. The molding SU or the encapsulation in a plastic part allows a high rigidity of the whole assembly to be guaranteed.

It will be noted that a low-frequency antenna LF_A is responsible for the function authorizing start-up, commonly referred to as coded anti-start device in the case of a vehicle application. More particularly, it allows the anti-theft system to be unlocked via a component known as engine control well known to those skilled in the art.

In the case illustrated in FIG. 7, the radiofrequency antenna RF_A shown is designed in such a manner as to form one loop in the horizontal plane and one loop in the vertical plane. It is formed from a rigid wire, preferably copper, in a single piece.

The radiofrequency antenna with two loops is accessible at two points CO, and the low-frequency loop antenna is accessible at two other points CB.

Here, the low-frequency loop antenna LF_A is concentric with the radiofrequency loop antenna. It may be, in nonlimiting embodiments, either of a larger or smaller diameter than the diameter of the loop, here BV, of the radiofrequency antenna, or of identical diameter if it is placed in a plane parallel to that of the loop, a close parallel plane compared to the size of the antenna.

In the case where it has a different diameter, the loop of the low-frequency antenna is either in the same plane or else in a different plane from the radiofrequency loop.

The cross section of the wire and also the geometries of the radiofrequency or low-frequency antenna loops may be of any given shape.

In the case of an association of the radiofrequency antenna device described in the preceding figures with a low-frequency antenna, the coupling between the radiofrequency antenna device and the low-frequency antenna device must be limited in order to avoid interference between these two radiofrequency and low-frequency devices. Indeed, even though they do not work at the same frequencies, spurious coupling phenomena do exist owing to their proximity. The RF efficiency of the Radio device can thus be degraded, and similarly the transmission margins of the low-frequency device may also be reduced. Thus, there is a risk of the vehicle not starting and of a reduction in the opening range of the doors in the case of the application described.

In order to avoid these drawbacks, high-impedance components/circuits are to be provided in the circuit of the low-frequency antenna, for example tank circuits, that prevent resonance of the low-frequency antenna at the working frequency of the radiofrequency antenna, thus reducing any risk of interference between the two radiofrequency and low-frequency antenna devices. The working frequency of the radiofrequency antenna is that of the radiofrequency transmitter.

These tank circuits thus exhibit a high impedance when the mixed antenna device REF/LF operates at a frequency situated in the radiofrequency range and a low impedance when the antenna device RE/LF operates at a low frequency. These tank circuits are associated with the low-frequency antenna.

Matching components/circuits associated with the radiofrequency antenna are also provided, in order to tune the radiofrequency antenna to the working frequency of the radiofrequency antenna (in other words, that of the radiofrequency transmitter).

Figure 9:
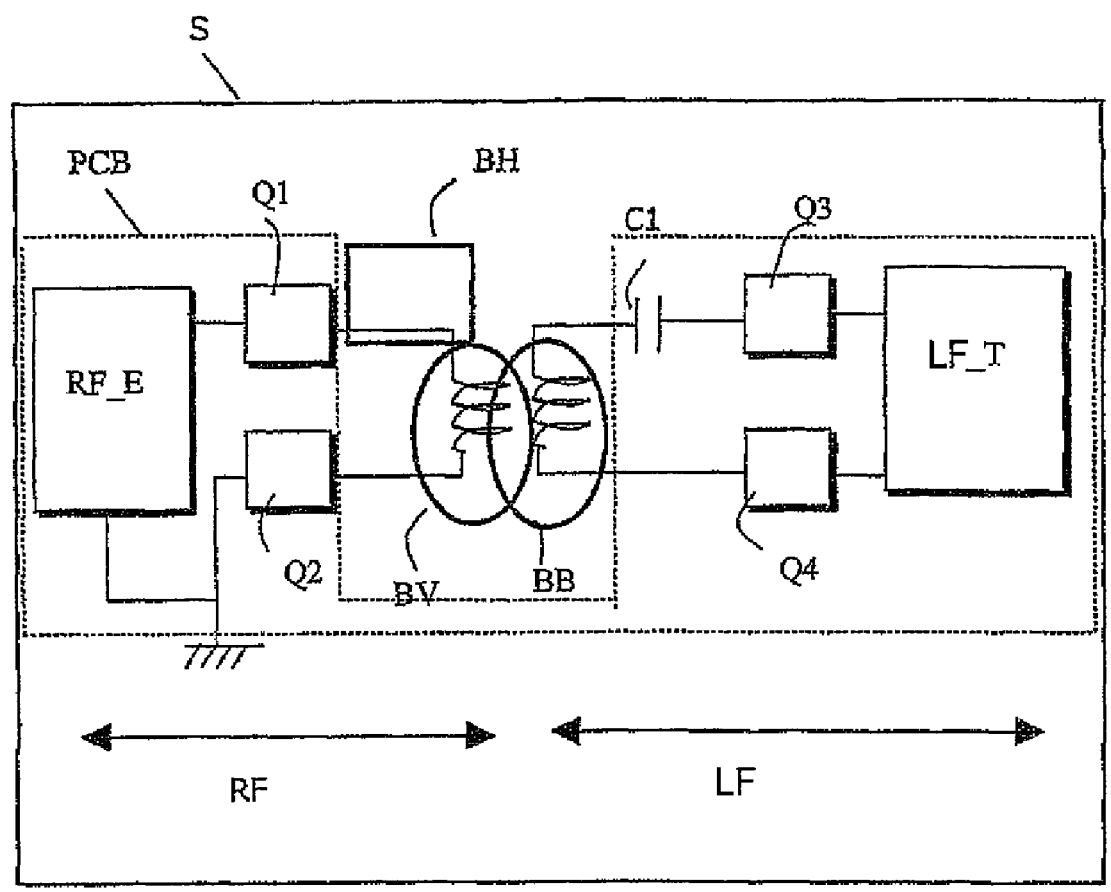
FIG. 9 shows schematically an electronic system comprising the antenna device in FIGS. 7 and 8.
Figure 10:
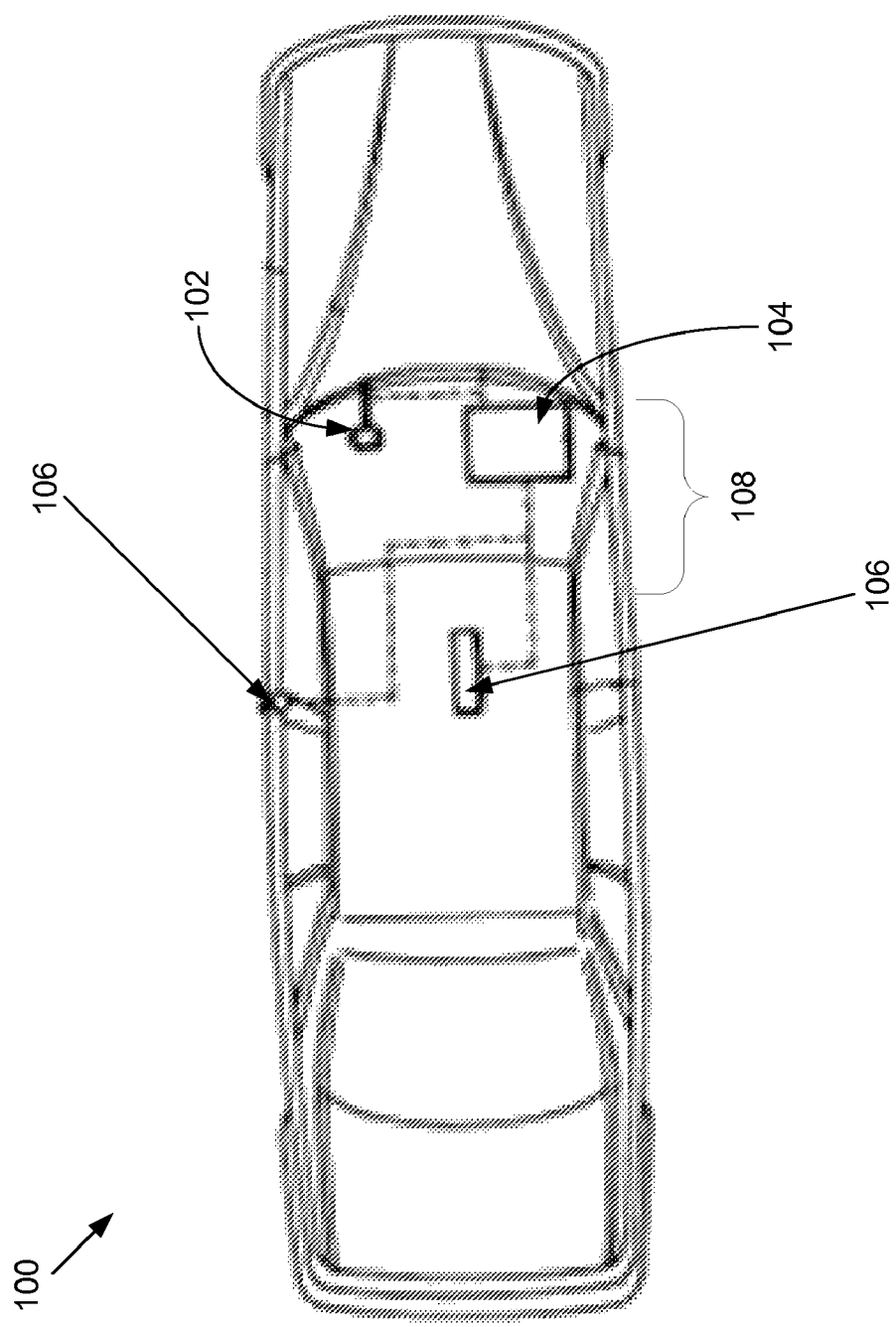
FIG. 10 shows a motor vehicle with various components.

One nonlimiting example of a system S integrating the antenna device RF/LF together with the tank circuits and matching circuits is illustrated in FIG. 9.

Such a system comprises:
For the radiofrequency part RF:
   a radiofrequency receiver RF_E for transmitting the radiofrequency signal received from the radiofrequency antenna to a passenger compartment controller, the latter authorizing the opening of the doors,
   a radiofrequency antenna RF_A with the two orthogonal loops BH and BV, allowing a radiofrequency signal originating from a transmitter, here for example the ignition key with radiofrequency function, to be received, two matching circuits each comprising, in this nonlimiting example, a quadrupole Q1 and Q2 having the function of filtering the low frequencies coming from the low-frequency device, and of tuning the radiofrequency antenna to the working frequency so that the demodulation of the radiofrequency signal received is performed correctly by the radiofrequency receiver RF_E.
For the low-frequency part LF:
   a low-frequency transceiver LF_T for modulating/demodulating a low-frequency signal, a low-frequency antenna LF_A allowing a low-frequency signal to be received or transmitted, two tank circuits each comprising, in this nonlimiting example, a dipole Q3 and Q4 having the function of filtering the radiofrequencies coming from the radiofrequency device. It can be seen that the supply of said low-frequency antenna LF_A is effected via high impedance circuits, of the tank circuit type, at the working frequency of the radiofrequency antenna. In other words, the supply is effected by the transceiver LF_T and is applied via the tank circuits Q3, Q4.

In this example, the two tank circuits Q3, Q4 are situated on either side of the low-frequency antenna, so as to obtain open circuits at the working frequency of the radio transmitter. Thus, an open circuit is obtained on the low-frequency side when the whole of the system S operates at radiofrequency reducing any interference due to the coupling. The fact that this interference is eliminated as much as possible additionally prevents any resonance of the low-frequency antenna at the working frequency of the radiofrequency antenna.

In contrast, there will be a short-circuit on the low-frequency side when the complete system S operates at low frequency.

Similarly, in this example, the two matching circuits Q1, Q2 are located on either side of the radiofrequency antenna. The matching circuits Q1, Q2 are defined in such a manner as to tune the radiofrequency antenna to the working frequency of the radio transmitter.

The dipoles Q3, Q4 thus comprise, in one nonlimiting example, a high-frequency RLC notch filter.

The quadrupoles Q1, Q2 thus comprise, in one nonlimiting example, a high-pass filter and a T or Π structure for tuning the radiofrequency antenna RF_A.

In one nonlimiting embodiment, the system S also comprises means enabling the current in the low-frequency antenna to be increased in order to obtain an improved transmission between the low-frequency antenna LF_A and, here, for example, the ignition key with the low-frequency function. These means are illustrated by a capacitor C1 in series with the coil of the antenna LF_A. A lower total impedance, and therefore a higher current, a higher magnetic field and an improved transmission-reception, are thus obtained. Therefore, this allows the low-frequency antenna to be tuned.

It will be noted that, practically speaking, the system S is composed of:
- an electronic board of the PCB type, notably comprising the low-frequency transceiver LF_T, the radiofrequency receiver RF_E, the matching and tank circuits Q1, Q2, Q3, and Q4, a micro-controller allowing communication to be established with controllers of the vehicle such as, for example, the passenger compartment controller or engine control, and the capacitor C1; and
- the mixed antenna device RF/LF comprising the radiofrequency and low-frequency antennas, said antennas being connected to the electronic board via their respective connection ends CO and CB.

In one nonlimiting embodiment, the electronic board is disposed in a plane parallel to one of the loops of the radiofrequency antenna in such a manner as to obtain an optimization of the volume taken up by the system S; for example, the first loop BH.

It goes without saying that the invention is not limited to the application of the motor vehicle described, but can be used in all applications involving the use of a radiofrequency antenna and a low-frequency antenna such as a home automation application.

The invention claimed is:

1. An electronic system (S), comprising:
   a radiofrequency antenna device with orthogonal loops, designed for receiving electromagnetic waves, comprising at least two loops (BH, BV) formed from a single electrical conductor (C), each of said loops (BH, BV) being able to be of any shape and situated in their respective planes, said planes which each contain one of said loops (BH, BV) being orthogonal, wherein the radiofrequency antenna is situated close to a low-frequency antenna (LF_A); and
   an electronic board (PCB) associated with the antenna device comprising at least one tank circuit (Q3, Q4), associated with the low-frequency antenna (LF_A), which exhibits a high impedance at the working frequency of the radiofrequency antenna.

2. The electronic system as claimed in claim 1, wherein the shape of said loops (BH, BV, BB) is circular or square or rectangular.

3. The electronic system as claimed in claim 1, wherein the shape of said loops (BH, BV) of the radiofrequency antenna is not identical.

4. The electronic system as claimed in claim 1, wherein one of said loops of the radiofrequency antenna is contained within a vertical plane (PV) and the other of said loops of the radiofrequency antenna is contained within a horizontal plane (PH).

5. The electronic system as claimed in claim 1, wherein the loop of the radiofrequency antenna of circular shape (BV) is situated in the vertical plane (PV) and the loop of the radiofrequency antenna of rectangular shape (BH) is situated in the horizontal plane (PH).

6. The electronic system as claimed in claim 1, wherein the electrical conductor (C, C') of one antenna is made of a material of low ohmic resistivity, such as copper, aluminum or its alloys, nickel, silver or copper coated with a layer of gold.

7. The electronic system as claimed in claim 1, wherein the cross section of the electrical conductor (C, C') is circular, square, rectangular or of any given shape.

8. The electronic system as claimed in claim 1, wherein the assembly formed by said loops (BH, BV, BB) is coated with a dielectric material.

9. The electronic system as claimed in claim 1, wherein the system is designed for motor vehicle applications in any given location within the passenger compartment of the motor vehicle.

10. The electronic system as claimed in claim 9, wherein the system is situated at a top of a steering column or within a processor that manages sensors and actuators of said passenger compartment.

11. The electronic system as claimed in claim 1, wherein the radiofrequency antenna is molded together with said low-frequency antenna.

12. The electronic system as claimed in claim 1, wherein said low-frequency antenna is associated with circuits, of the tank circuit type (Q3, Q4), which present a high impedance at the working frequency of the radiofrequency antenna.

13. The electronic system as claimed in claim 12, wherein the tank circuits (Q3, Q4) prevent a resonance of the low-frequency antenna at the working frequency of the radiofrequency antenna.

14. The electronic system as claimed in claim 12, wherein the tank circuits comprise a high-frequency notch filter.

15. The electronic system as claimed in claim 1, wherein said loops (BH, BV) of the radiofrequency antenna are connected in series.

16. The electronic system as claimed in claim 1, wherein said loops (BH, BV) of the radiofrequency antenna are connected in parallel.

17. The electronic system as claimed in claim 1, wherein the radiofrequency antenna (RF_A) is tuned by means of matching circuits (Q1, Q2).

18. The electronic system as claimed in claim 1, wherein the low-frequency antenna is responsible for authorizing start-up of a motor vehicle.

19. The electronic system as claimed in claim 1, wherein the radiofrequency antenna device (RF_A) is tuned by means of matching circuits (Q1, Q2).

20. The electronic system as claimed in claim 1, wherein the low-frequency antenna (LF_A) is associated with at least one tank circuit (Q3, Q4), which exhibits a high impedance at the working frequency of the radiofrequency antenna.

21. The electronic system as claimed in claim 1, wherein the electronic board (PCB) is situated in a plane parallel to one loop of the radiofrequency antenna (RF_A).

22. The electronic system as claimed in claim 1, further comprising a capacitor (C1) in series with the low-frequency antenna (LF_A).

23. The electronic system, as claimed in claim 1, further comprising at least one matching circuit (Q1, Q2) for tuning the radiofrequency antenna (RF_A).

24. An electronic board designed to be incorporated in the electronic system as claimed in claim 1, wherein the board comprises:
   a radiofrequency receiver (RF_E) designed to cooperate with the radiofrequency antenna (RF_A);
   a low-frequency transceiver (LF_T) designed to cooperate with the low-frequency antenna (LF_A); and
   at least one tank circuit (Q3, Q4) associated with the low-frequency antenna, which presents a high impedance at the working frequency of the radiofrequency antenna.

25. The electronic board as claimed in claim 24, further comprising at least one matching circuit (Q1, Q2) for tuning the radiofrequency antenna (RF_A).

* * * * *